（12） United States Patent
Tarozzo

(10) Patent No.: US 10,500,556 B2
(45) Date of Patent: Dec. 10, 2019

(54) RADIAL FLOW HORIZONTAL CATALYTIC REACTOR

(71) Applicant: Casale SA, Lugano (CH)

(72) Inventor: Mirco Tarozzo, Ligornetto (CH)

(73) Assignee: Casale SA, Lugano (CH)

(*) Notice: Subject to any disclaimer, the term of this patent is extended or adjusted under 35 U.S.C. 154(b) by 0 days.

(21) Appl. No.: 15/319,674

(22) PCT Filed: Jun. 3, 2015

(86) PCT No.: PCT/EP2015/062319
§ 371 (c)(1),
(2) Date: Dec. 16, 2016

(87) PCT Pub. No.: WO2015/193106
PCT Pub. Date: Dec. 23, 2015

(65) Prior Publication Data
US 2017/0128902 A1    May 11, 2017

(30) Foreign Application Priority Data

Jun. 17, 2014    (EP) .................... 14172845

(51) Int. Cl.
*B01J 8/00* (2006.01)
*B01J 8/02* (2006.01)
(Continued)

(52) U.S. Cl.
CPC .......... *B01J 8/0214* (2013.01); *B01J 8/0285* (2013.01); *B01J 2208/00194* (2013.01); *B01J 2208/00814* (2013.01)

(58) Field of Classification Search
CPC .... B01J 8/00; B01J 8/02–0214; B01J 8/0285; B01J 2208/00–00017; B01J 2208/00106;
(Continued)

(56) References Cited

U.S. PATENT DOCUMENTS 4,452,760 A    6/1984  Peterson et al.
4,919,909 A *  4/1990  Lesur ..................... B01J 8/0005
                                                    422/148
(Continued)

FOREIGN PATENT DOCUMENTS

EP    1 300 190 A1    4/2003
EP    1 464 384 A1    10/2004
(Continued)

OTHER PUBLICATIONS

International Search Report issued in connection with PCT/EP2015/062319.

(Continued)

*Primary Examiner* — Natasha E Young
(74) *Attorney, Agent, or Firm* — Akerman LLP

(57) ABSTRACT

Horizontal adiabatic reactor (1) for heterogeneous catalytic reactions, comprising an outer cylindrical shell (2), an inlet (6) for reagent gases and an outlet (7) for gaseous products, a basket (10, 13) containing a catalytic bed (5a, 5b) positioned horizontally inside said reactor, wherein said reactor is configured in such a way that the gases cross said catalytic bed in a radial or axial-radial manner, said shell (2) has a cover (4) which can be opened and which defines an opening (20), and said basket (10, 13) is extractable horizontally from said opening.

6 Claims, 2 Drawing Sheets

(51) Int. Cl.
*B01J 8/04* (2006.01)
*B01J 19/00* (2006.01)
*B01J 19/24* (2006.01)

(58) Field of Classification Search
CPC .... B01J 2208/00168; B01J 2208/00194; B01J 2208/00796–00814; B01J 8/0015; B01J 8/0035; B01J 8/04–0407; B01J 8/0496; B01L 9/00; B01L 9/24
See application file for complete search history.

(56) References Cited

U.S. PATENT DOCUMENTS

| | | | |
|---|---|---|---|
| 7,314,603 B2* | 1/2008 | Filippi | B01J 8/0035 422/198 |
| 7,867,465 B2* | 1/2011 | Blanchard | B01J 8/0423 423/359 |
| 8,158,074 B2 | 4/2012 | Filippi et al. | |
| 8,202,917 B2* | 6/2012 | Espinoza | B01J 8/0221 422/148 |

FOREIGN PATENT DOCUMENTS

| | | |
|---|---|---|
| WO | 95/24961 A1 | 9/1995 |
| WO | 2009/056488 A1 | 5/2009 |
| WO | 2010/014217 A1 | 2/2010 |

OTHER PUBLICATIONS

International Preliminary Report on Patentability issued in connection with PCT/EP2015/062319.

* cited by examiner

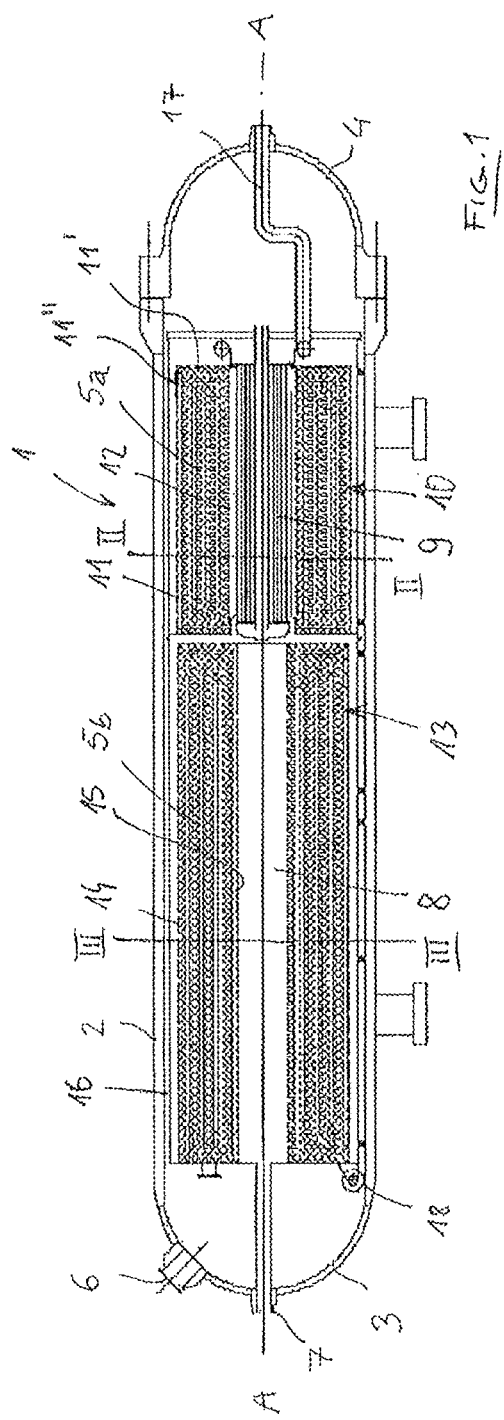
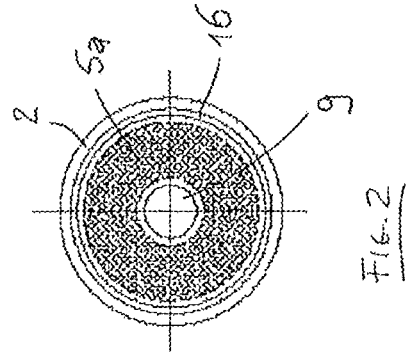
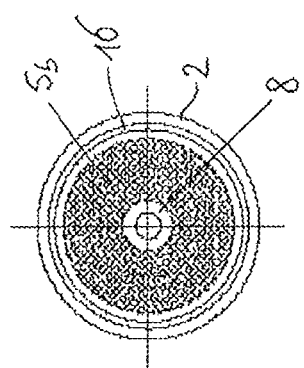

RADIAL FLOW HORIZONTAL CATALYTIC REACTOR

This application is a national phase of PCT/EP2015/062319, filed Jun. 3, 2015, now WO2015/193106, and claims priority to EP 14172845.1, filed Jun. 17, 2014, the entire contents of both of which are hereby incorporated by reference.

FIELD OF APPLICATION

The present invention relates to a horizontal adiabatic reactor for heterogeneous catalytic reactions.

PRIOR ART

In the sector of heterogeneous catalytic reactions for the industrial synthesis of chemical products, such as ammonia, methanol, formaldehyde and styrene, isothermal (or near isothermal) reactors and adiabatic reactors are known. Isothermal or near isothermal reactors comprise a heat exchanger able to keep the temperature of the catalytic bed at a substantially constant value or within a predetermined range, supplying or removing heat in the case of an endothermic or exothermic reaction respectively. The adiabatic reactors do not envisage direct cooling of the catalytic bed and may have intermediate exchangers between different catalytic beds (intercooled beds).

In horizontal-axis adiabatic reactors, according to the prior art, the gaseous flow of the reagents and the products is directed transversely with respect to the reactor axis. For example multi-bed reactors are provided, where each single catalytic bed is crossed by a gaseous flow which is directed substantially vertically from the top downwards or vice versa. From the point of view of constructional design, each catalytic bed is supported inside a cartridge by flat perforated grids; said grids are arranged, viewing the cartridge in cross-section, along a circumferential chord of the said cartridge. The top part of the bed may be provided with fixed or floating grids which have the function of protecting the catalyst from the action of gas flowing over it. The inlet and outlet sections of each bed are therefore circular segments. A horizontal reactor according to the prior art is described for example in EP-A-1464384.

These reactors, however, are affected by a number of drawbacks and technical problems which have not been completely solved.

A first problem relates to the degree of filling, namely the quantity of catalyst which may be placed inside the reactor in relation to the volume available. There is an incentive to try to increase this ratio in order to maximize the production and, for this reason, the prior art teaches to reduce the sections of the aforementioned circular segments, which form the inlet and outlet sections of each single catalytic bed. However, the reduction of the inlet and outlet sections results in a number of disadvantages which are summarised below.

Decreasing the sections, in particular the inlet section, the velocity of the gas increases for the same flowrate and density of the gas. Since the flow of the gas is tangential to the catalytic bed, the increase in velocity has an effect of entrainment and fluidization on the catalyst particles, with consequent erosion of the grids and displacement and accumulation of the catalytic mass. This may result in malfunctioning of the reactor and, in some cases, internal mechanical damages.

The smaller sections available make access more difficult during loading or replacement of the catalyst.

Loading of the catalyst is typically performed through hatches situated on the shell of the cartridge, or by accessing directly the inside of the cartridge itself. Unloading of the used catalyst is performed normally by means of a series of hatches situated along the bottom generatrix of the cylindrical shell (or vessel). Both these operations are complicated by the small amount of space available: for example they increase the time required for loading the catalyst and the uniformity of the catalyst density is reduced, with possible consequences on the reactor performances; unloading is also more difficult and requires internal cleaning of the reactor in order to remove the deposits which remain between one nozzle and the next one. Consequently replacement of the catalyst and the periodic maintenance operations take longer and cost more.

Another problem of the transversal flow with respect to the axis is the non-optimal use of the catalyst. In fact, the gas tends to follow the shortest path (with lower head loss) between the inlet section and the outlet section, and consequently some catalyst zones, in particular those close to the vessel walls, are under-used.

A further problem of horizontal reactors is due to settling of the catalyst. Settling may in fact leave catalyst zones which are exposed, i.e. acted on directly by the gas, and which are subjected to migration of the catalyst which may result in malfunctioning of the reactor and/or problems of loss of tightness.

The invention aims to overcome these drawbacks.

SUMMARY OF THE INVENTION

The invention aims to provide a horizontal catalytic reactor which is able to achieve the following: a high filling coefficient; reduction of the effect of entrainment and fluidization of the catalyst; a uniform flow of the gas inside the catalytic bed; elimination of the critical points in terms of catalyst tightness; and easier access internally with consequent easier loading and unloading of the catalyst.

The object is achieved with a horizontal adiabatic reactor for heterogeneous catalytic reactions, comprising:
a cylindrical outer shell,
an inlet for a flow of reagent gases and an outlet for a flow of gaseous products;
at least one basket containing at least one catalytic bed, said catalytic bed being positioned horizontally inside said reactor;
characterized in that:
said reactor is configured in such a way that said gas flow crosses said at least one catalytic bed in a radial or axial-radial manner; and
said shell has a cover which can be opened and said basket can be extracted horizontally from said opening.

The term "radial flow" indicates a flow crossing the bed in a centripetal or centrifugal radial manner; the term "axial-radial flow" indicates that a smaller part of the catalytic bed is affected by a mainly axial (horizontal) flow and the remaining greater part of the bed is affected by a mainly radial flow. The flow is guided by headers situated inside and outside the bed, for example gas-permeable cylindrical walls. Said walls may be formed by perforated or slotted metal plates.

Said at least one catalytic bed has preferably an annular configuration. A heat exchanger for cooling the flow leaving the said bed, or a gas discharge tube, may be housed in the centre of an annular bed.

In a preferred embodiment of the invention, the reactor comprises two catalytic beds which house respectively said heat exchanger and said gas discharge tube, which are both coaxial.

In order to allow the extraction of the basket, a reactor according to the invention comprises advantageously a system of linear guides, for example in a preferred embodiment the basket is provided with wheels or rollers which engage rails fixed to the shell.

A basket extracted from the reactor may be positioned vertically for the catalyst loading and unloading operations. This constitutes an advantage because the same techniques applied to vertical reactors may be used, both in order to remove the old catalyst and in order to introduce the fresh catalyst.

Another aspect of the invention consequently consists in a method for replacing catalyst in an adiabatic horizontal catalytic reactor comprising at least one catalytic bed associated with a horizontally extractable basket, the method being characterized by the following operations.

extracting said basket from said shell;
vertically positioning said basket;
removing the used catalyst from said basket in a vertical position;
inserting fresh catalyst inside said basket in a vertical position; and
reintroducing said basket in a horizontal position and inserting it inside the shell.

The aforementioned problems are thus solved by the invention. The filling coefficient of the reactor is decidedly greater than that of the horizontal reactors according to the prior art, and comparable to that of vertical axial-radial reactors. Another advantage consists in the fact that the inflow of the gas into the bed and the outflow of the gas therefrom take place through cylindrical surfaces rather than circular segments, thus reducing the negative effect of catalyst fluidization or entrainment. The accessibility is improved and the catalyst loading and unloading operations result easier and quicker. By using baskets which are extracted from the shell and positioned vertically, in fact, it is possible to employ the known catalyst loading and unloading techniques used for vertical reactors, thus achieving also a greater uniformity of the catalyst loading density.

Another advantage is the uniformity of the gas flow inside the catalyst owing to the axial symmetry of the catalytic bed or beds. A further advantage consists in the fact that a reactor according to the invention does not require the presence of catalyst leak-tight zones between cartridge and supporting grids or protection grids above the catalytic bed. Consequently the most critical points for catalyst tightness are eliminated.

Further characteristic features and advantages of the chemical reactor according to the present invention are illustrated in the description of an embodiment thereof, provided below, with reference to examples and attached drawings.

BRIEF DESCRIPTION OF THE FIGURES

FIG. 1 shows a diagrammatic longitudinally sectioned view of the reactor in accordance with the present invention.

FIG. 2 shows a diagrammatic cross-sectional view of the reactor according to FIG. 1 along the cross-sectional plane II-II.

FIG. 3 shows a diagrammatic cross-sectional view of the reactor according to FIG. 1 along the cross-sectional plane III-III.

DETAILED DESCRIPTION OF A PREFERRED EMBODIMENT

Figure 4:
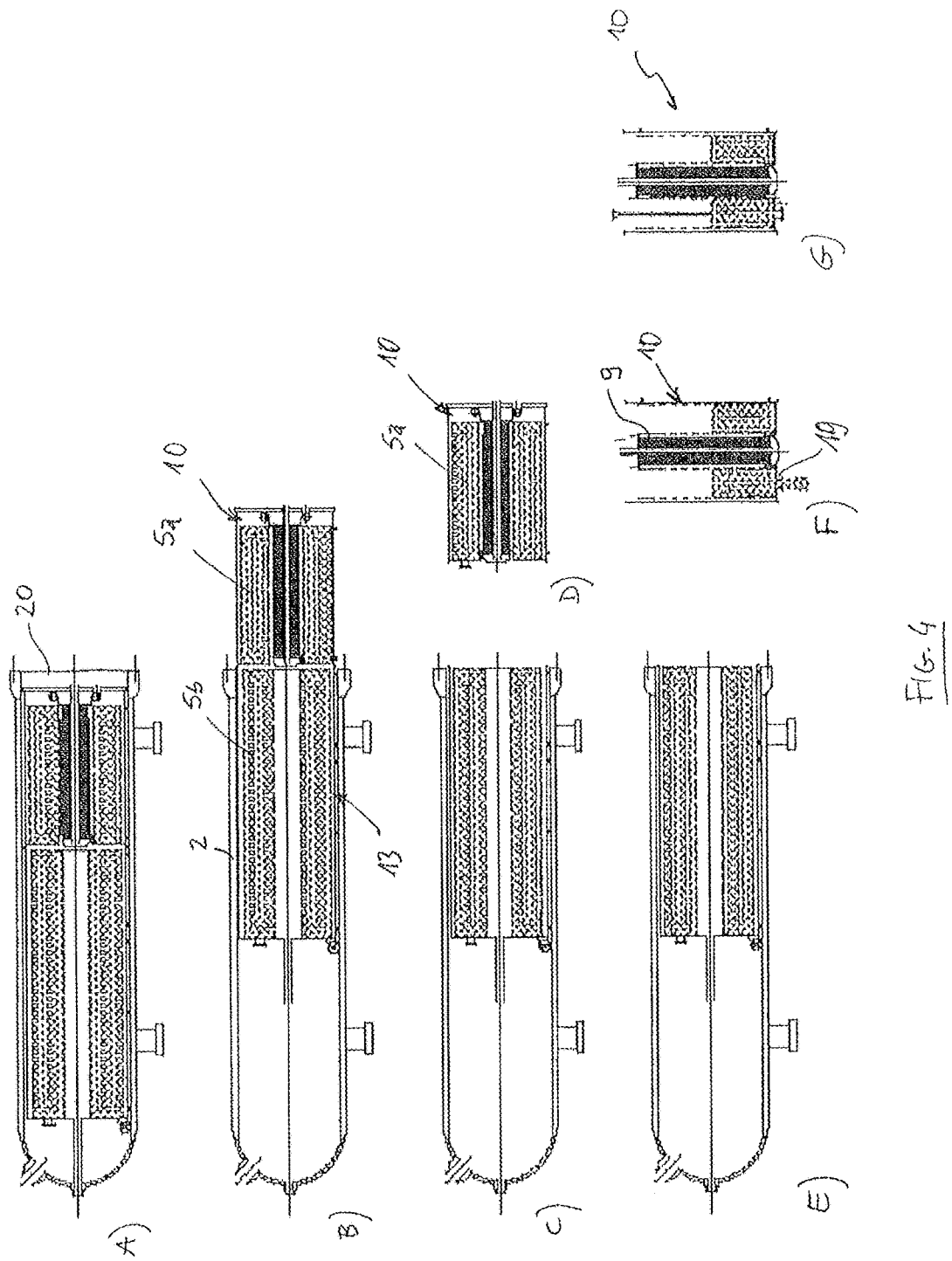
FIG. 4 shows the sequence of operations for loading and unloading the catalyst into/from the reactor.

FIG. 1 shows a horizontal adiabatic reactor 1 which comprises a cylindrical shell 2, with a longitudinal axis A-A enclosed by a base 3 welded to the shell 2 and by a cover 4 which can be opened and is flanged together with the shell 2.

The reactor comprises, in the example shown, two catalytic beds 5a and 5b with annular configuration and radial symmetry; it further comprises an inlet 6 for a gaseous flow of reagents and an outlet 7 for gaseous reaction products, said outlet 7 communicating with a header 8 coaxial with the second catalytic bed 5b. An inter-cooling heat exchanger 9 is instead arranged in the centre of the first catalytic bed 5a.

The first catalytic bed 5a is contained inside a basket 10 and is delimited by an outer cylindrical wall 11 and an inner cylindrical wall 12. Both said walls 11 and 12 are gas-permeable, for example perforated. Similarly, the second catalytic bed 5b is contained inside a basket 13 and is delimited by gas-permeable cylindrical walls 14, 15.

Said reactor 1 is configured in such a way that the gas flow entering the inlet 6 crosses the catalytic beds in a radial or axial-radial manner. In particular, said incoming flow travels along a space 10 around the catalytic beds (cooling the walls of the shell 2), and then enters the bed 5a via the perforated wall 11 and crosses the bed 5a with a centripetal radial flow.

In order to obtain an axial-radial flow, the surface 11' is gas-permeable, while a portion of the wall 11, for example the strip 11' on the right-hand side in FIG. 1, is gas-impermeable (not perforated). In this way a part of the gas enters the bed axially across the surface 11'.

The flow leaving the first catalytic bed 5a, via the inner wall 12, passes into the shell side of the heat exchanger 9, where it is cooled releasing heat to a fluid entering via the connection 17, and is then conveyed to the second bed 5b. Said second bed 5b is also crossed with a centripetal radial or axial-radial flow, with inflow via the outer wall 14 and outflow via the inner wall 15 such that the reaction products are collected inside the outlet header 8.

Examples of embodiments of walls permeable to a gas flow and designed to contain a catalyst mass are described for example in EP 1818094 and EP 2014356.

The baskets 10 and 13 are extractable from the shell 2. Said baskets 10, 13 are preferably slidable on linear guides such as, for example, one or more longitudinal rails. For example FIG. 1 shows a guide wheel or roller 18.

FIG. 4 shows the sequence of operations for changing the catalyst contained inside the first catalytic bed 5a.

FIG. 4 A) shows the reactor 1, once the cover 4 has been removed. Said cover is of the fully opening type, namely it has the same diameter as the shell 2 and consequently its removal allows the basket 10 to be extracted from the opening 20, as can be seen in FIG. 4B).

From this position, the basket 10 can be freed by removing the existing mechanical and/or fluid connections which fasten it to the basket 13 of the second bed and separating the basket from the reactor as shown in FIGS. 4C) and D).

The basket extracted from the reactor may be arranged vertically, rotating it through 90 degrees for the operations of replacement of the catalyst. In particular, FIG. 4F) shows the unloading of the old catalyst which is performed from the bottom, through at least one discharge nozzle 19; FIG. 4G) shows the insertion of new catalyst which is poured in from above into the basket. Said operations may be performed using the known vertical reactor techniques.

The second catalytic bed 5b and associated basket 13 may be extracted for replacement of the catalyst using a similar procedure.

In a preferred embodiment said heat exchanger 9 uses water as a cooling fluid, with the production of steam which is used in other parts of the plant. As an alternative, said heat exchanger 8 may use as cooling fluid part of the cold gaseous reagents, therefore acting as a preheating system for said gaseous reagents.

It may be noted that the inlet and outlet sections of the catalytic beds are cylindrical walls, thus avoiding the risks of catalyst fluidization which were mentioned above and which affect the horizontal reactors of the prior art.

The radial or axial-radial flow allows to obtain a uniform flow of the gas inside the catalytic bed, therefore control over the optimum temperature and a high heat exchange. It ensures moreover a uniform distribution of the gas as in vertically arranged reactors.

The invention claimed is:

1. A horizontal adiabatic reactor for heterogeneous catalytic reactions, comprising:
   a cylindrical outer shell,
   an inlet for a flow of reagent gases and an outlet for a flow of gaseous products;
   at least one basket containing at least one catalytic bed, said catalytic bed being positioned horizontally inside said reactor;
   wherein:
   said reactor is configured in such a way that said gas flow crosses said at least one catalytic bed in a radial or axial-radial manner, wherein said at least one catalytic bed has an annular configuration and radial symmetry; and
   said shell has a cover which can be opened and defines an opening and said basket can be extracted horizontally from said opening;
   the reactor comprising a first catalytic bed in the centre of which a coaxial heat exchanger is housed, and a second catalytic bed in the centre of which a coaxial gas discharge tube is housed.

2. The reactor according to claim 1, wherein said at least one catalytic bed has cylindrical inlet surfaces and outlet surfaces for said reagents and gaseous products, respectively.

3. The reactor according to claim 2, wherein said surfaces are defined by gas-permeable coaxial walls for containing the bed.

4. The reactor according to claim 1, wherein said at least one basket is slidable along at least one linear guide.

5. The reactor according to claim 1, wherein said at least one basket is delimited by an inner cylindrical wall and by an outer cylindrical wall which are at least partly permeable to said gas flows such that an axial or axial-radial flow crosses the catalytic bed.

6. A method for replacing catalyst in an adiabatic horizontal catalytic reactor, the adiabatic horizontal catalytic reactor comprising:
   a cylindrical outer shell;
   an inlet for a flow of reagent gases and an outlet for a flow of gaseous products;
   at least one basket containing at least one catalytic bed, said catalytic bed being positioned horizontally inside said reactor;
   wherein:
   said reactor is configured in such a way that said gas flow crosses said at least one catalytic bed in a radial or axial-radial manner, wherein said at least one catalytic bed has an annular configuration and radial symmetry; and
   said shell has a cover which can be opened and defines an opening and said basket can be extracted horizontally from said opening;
   wherein the method comprises the following operations:
   horizontally extracting said basket from said shell;
   vertically positioning said basket;
   removing the used catalyst from said basket in a vertical position;
   inserting fresh catalyst inside said basket in a vertical position; and
   reintroducing said basket in a horizontal position and inserting it inside the shell.

* * * * *